Jan. 17, 1933.  J. C. CREAGMILE  1,894,532
WHEEL ALIGNING DEVICE
Filed Aug. 6, 1929
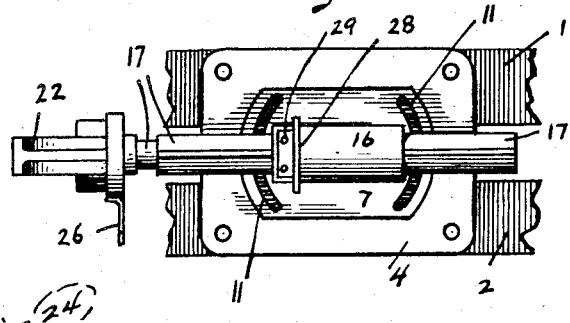
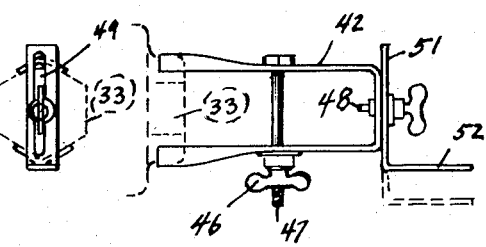
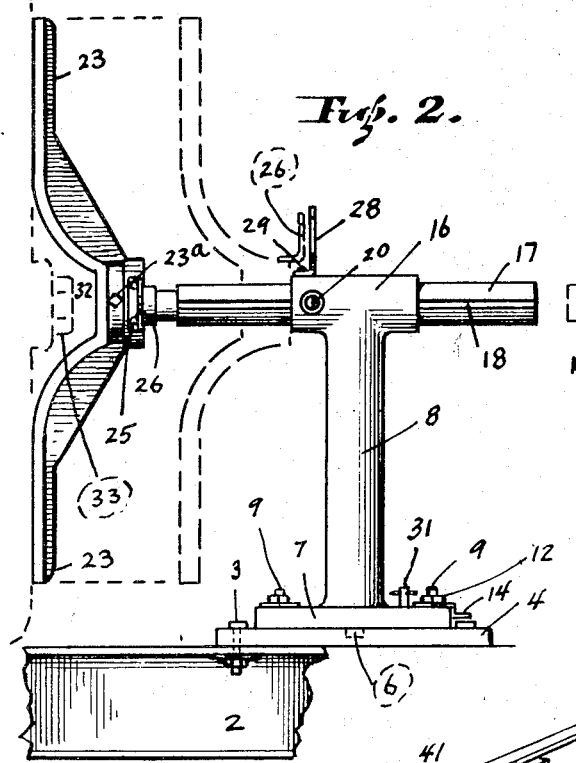
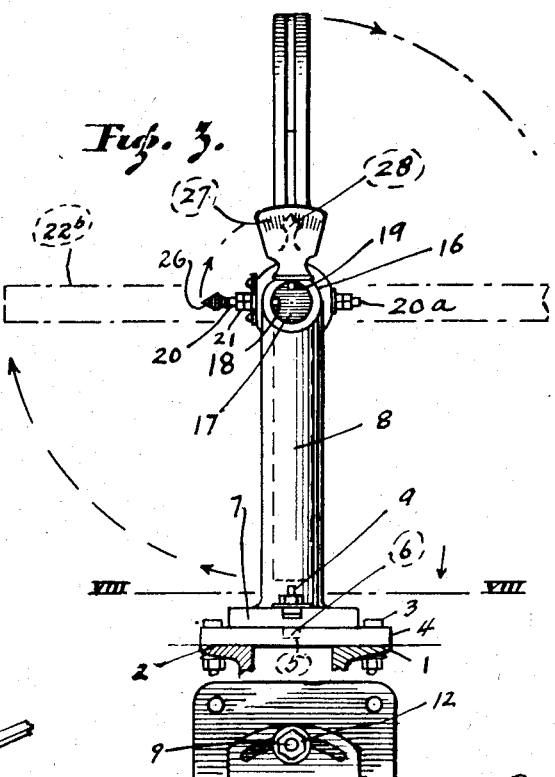
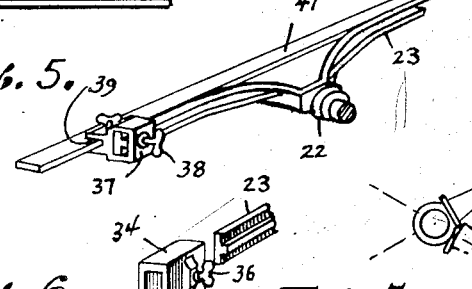
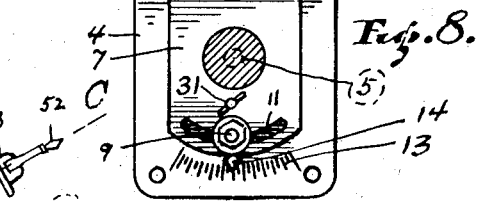
INVENTOR.
John C. Creagmile.
BY Townsend Rafter + Abbett
ATTORNEYS.

Patented Jan. 17, 1933

1,894,532

UNITED STATES PATENT OFFICE

JOHN C. CREAGMILE, OF OAKLAND, CALIFORNIA

WHEEL ALIGNING DEVICE

Application filed August 8, 1929. Serial No. 383,850.

The invention relates to aligning devices for automobile wheels.

It is the principal object of the present invention to provide a generally improved and simplified apparatus for facilitating the measurement of the degree of angularity of automobile wheels for the corrective treatment of caster, camber, toe-in and turning radius.

In carrying out this object into practice, I provide a standard member which is rotatable on a vertical axis and in which is slidably journaled a member which is rotatable on a horizontal axis. This latter member is provided with means for extension and retraction toward and away from the side of an automobile wheel for the purpose of determining the angularity of the wheel mounting in various planes.

The device is of a simple nature and is inexpensive to manufacture and affords accurate readings for the corrective treatment of the steering wheel structure by automobile mechanics.

One form which the invention may assume is exemplified in the following description and illustrated by way of example in the accompanying drawing.

In the drawing:

Figure 1 is a top plan view of my device, as it would appear when mounted on a pair of parallel channel irons, which are shown in fragment.

Figure 2 is a side elevation of same.

Figure 3 is an end view of Figure 2.

Figure 4 is a side view of a clamp member shown in position to engage a hub cap of an automobile wheel, said cap being indicated in dotted lines.

Figure 4a is an end view of Figure 4.

Figure 5 is a perspective view of a radial arm member, shown in fragment, and attached thereto is a yoke block for engaging said arm and supporting an extension bar in parallel relation thereto.

Figure 6 is a perspective view illustrating an arm block of another type.

Figure 7 is a diagrammatic view illustrating the partial rotation of a steering wheel assembly on the axis of the steering head spindle, for the purpose of better illustration of the method by which I measure the caster of an automobile wheel.

Figure 8 is a sectional view in plan of Figure 3 taken on the line 8—8 of said figure, and looking in the direction of the arrow.

Referring to the drawing the numerals 1 and 2 indicate similar parallel channel irons, placed back to back, to the upper flanges of which are secured, as by bolts 3, a platform member 4, which is centrally bored, as indicated at 5, Figures 2 and 3, to receive a pivot 6, which is a boss extending downwardly from a turntable member 7, having a centrally disposed upright standard 8, here shown as cylindrical in form and concentric with the pivot 6.

This pivotal connection affords a rotative movement of the standard 8 and turntable 7 with respect to the platform 4.

In order to removably secure the turntable 7 to the platform 4 I provide studs 9 which are secured to the platform 4 and extend upwardly therefrom through arcuate slots 11, in the turntable 7.

By this means the turntable 7 and standard 8 may be rotated with respect to platform 4 to any desired angle and secured in said position by nuts 12.

In order to provide a reading of the relative angularity of the members 7 and 4 I provide on the upper surface of the platform 4 a graduated scale indicated at 13, Figure 8.

At 14 I show an arrow, or indicator, secured to the platform 7 and adapted to overlie the graduations 13.

The standard 8 is provided with a transverse head portion 16 which is centrally bored on a horizontal axis to receive a shaft 17, which is provided with key ways 18 and 19 extending throughout the entire length of said shaft and disposed 90 degrees apart. Said key ways afford a sliding endwise movement of shaft 17, which is prevented from rotation by set screws 20 and 20ª extending into one of said keyways from the head 16. Lock nuts 21 secure setscrews 20 and 20ª in position.

An arm member 22, having radially disposed arms, is secured to shaft 17 by a setscrew 23a. When it is desired to measure the toe-in, the arm member 22 is moved to a horizontal position and then moved toward the wheel until it contacts with the latter at diametrically opposite points on the vehicle wheel, the latter being, of course, in its straight forward position.

When one arm contacts the wheel and the other does not the toe-in may be measured and if necessary corrected until it conforms with the accepted standard.

When the arm member is rotated to a horizontal position an arrow indicator 26, secured to said arm by screws 25, registers with graduations on a scale formed on an angle plate 28, secured as by screws 29 to the head 16.

When arm member 22 is to be extended on a horizontal plane, set screw 20 is backed away to clear the keyway 18, and the shaft 17 is rotated in clockwise direction until keyway 19 registers with setscrew 20a. The keyways 18 and 19 may be referred to as angularly spaced longitudinally extending guiding portions of or on the longitudinally extending shaft 17, whereby when the said screw 20 extends into keyway 18, the shaft 17 carrying the arm 22—then extending vertically—can be moved longitudinally without turning and whereby upon retracting screw 20, then turning the shaft 17 and thereafter advancing screw 20a into keyway 19 of shaft 17 carrying the arm 22—then extending horizontally—can be moved longitudinally without turning.

In order to maintain a parallel relation between the shaft 17 and the channel irons 1 and 2, I provide a taper pin 31, which extends through registering openings in the turntable 7 and platform 4.

The arm member 22 is recessed at 32 the purpose being to admit thereinto the hub and hub cap 33 of an automobile wheel 24.

In Figure 6, I show a block 34 adapted to slide over either arm 22 and become engaged thereon by a thumbscrew 36. Two of these blocks are employed when the rim measurement is to be taken or when the contour of the tire makes it inconvenient to use the arms 22.

In Figure 5 I show a block 37 which is also slidable over arms 23, having a setscrew 38 for engagement thereof, said block being bifurcated, as indicated at 39, to receive and engage an extension bar 41 which, by this means, is supported in parallel relation to the arms 22 to engage the wheel when checking the turning radius or more accurately speaking when checking what is herein deemed the wheel steering angularity by which the turning radius is checked or determined.

In the operation of my device determination of camber is accomplished while the arms 23 are in their vertical position, the deviation of the wheel from the vertical as indicated by arms 23 being observed and recorded as usual. To determine the toe-in of the wheels the arms 23 are disposed in a horizontal position and the spacing between the front portion of the wheel, and the adjacent surface of the arms 23 is the amount of the toe-in of the wheel.

Mention has above been made to the steering wheel angularity. This expression relates to the angle—as measured in or determined on a horizontal plane that extends through the center of the forward wheel axis—which a forward wheel makes, to-wit, which the forward outside wheel makes, during a turning movement of the vehicle or car with a straight ahead direction of the vehicle, or in other words with the longitudinal axis of the vehicle. The turning radius of a vehicle or car is a function of the wheel turning angularity, for example of the forward outer wheel of the vehicle, and of the length of the wheel base of the vehicle. The length of the wheel base is already known or can be readily determined and when the wheel steering angularity is determined one can readily determine and thereby check the turning radius of the car.

When it is desired to check or measure the wheel steering angularity the arms 23 are rotated to the horizontal dotted line position indicated at 22b, Fig. 3 the wheel steering angularity may be checked or determined—and indirectly thereby the turning radius may be checked and determined—by extending the arms 22 by use of the bars 41 when in their horizontal position and rotating the standard 8 on its pivot 6 until the bar 41 contacts with the tire or rim of wheel 24 at diametrically opposite points, at which time the wheel steering angularity will be indicated by arrow 14 by its position over the graduation 13 on the plate 4.

To obtain a caster reading, or indication of the degree of caster of the steering wheel, I employ a clamp 42, shown in Figures 4 and 4a. This clamp is formed of flat material bent in substantially U-shape and its ends bent to an angle cross section adapted to engage the opposite corners of a hexagonal hub cap indicated in dotted lines at 33, Figures 2, 4a and 7.

A thumbscrew 46 threaded on a bolt 47 affords means for placing the clamp 42 securely on the hub cap.

At the end of clamp 42 which is remote from the hub cap, I provide a stud bolt 48 which extends through a slot 49 in an L-shaped member 51, the end of which is formed into an arrow 52. When it is desired to determine the caster of the front wheel spindle, the front wheel being tested is positioned in a straight forward position and then turned 25 degrees from its straight forward position in one direction. The arm member 22 is positioned in a horizontal position and is moved forwardly to a point contiguous to the pointer 52. At this time the member 22 and the several parts of the device are adjusted or positioned so that the longitudinal axis of shaft 17 coincides with or intersects the end point of the pointer 52 and also so that said axis of the shaft 17 extends at right angles to the longitudinal axis of the car. The pointer 52 is then adjusted until it lies in the same plane as the upper edge of the arm member 22. The arm member 22 is then retracted and the wheel is swung in a straight forward position and thence 25 degrees in the opposite direction. The arm member 22 is then advanced towards the wheel in a horizontal position and up to this movement the arm member 22 has remained parallel with the longitudinal axis of the car. At this time due to the caster which is the angularity of the wheel spindle, the pointer 52 will be in a more elevated position. The arm member 22 is then swung about the axis of the shaft 17 until its upper edge contacts with the pointer 52. The amount of swinging movement will, of course, be indicated on the dial 27 by the arrow 28. This dial, of course, indicates zero when the arm member 22 is in purely a horizontal position. The reading of the dial will indicate the degree of caster which is the degree of angularity of the axle spindle.

Having thus described my invention, what I claim and desire to secure by Letters Patent is—

1. A wheel aligning device comprising a base, a standard revolubly supported on said base to rotate about a vertical axis, a shaft journalled in said standard, revoluble about on a horizontal axis, an arm member secured to said shaft, and means adapted to prevent rotation of said shaft and at the same time permit an endwise movement thereof.

2. A wheel aligning device comprising a base, a standard revolubly supported on said base to rotate about a vertical axis, a shaft journalled in said standard, revoluble about a horizontal axis, an arm member secured to said shaft, means permitting longitudinal movement of said shaft but preventing rotation thereof, and means for indicating the relative angular positions of said standard and said base.

3. A wheel aligning device comprising a base, a standard revolubly supported on said base to rotate about a vertical axis, a shaft journalled in said standard, revoluble about a horizontal axis, an arm member secured to said shaft, means adapted to prevent rotation of said arm member and at the same time permit an endwise movement thereof, and means for indicating the relative angular positions of said shaft and said standard.

4. A wheel aligning device comprising a base, a standard revolubly supported on said base to rotate about a vertical axis, a shaft journalled in said standard, revoluble about a horizontal axis, an arm member secured to said shaft, means permitting longitudinal movement of said shaft but preventing rotation thereof, means for indicating the relative angular positions of said standard and said base and means for indicating the relative angular positions of said shaft and said standard.

5. A wheel aligning device comprising a base, a standard revolubly supported on said base to rotate about a vertical axis, a shaft journalled in said standard, which shaft has angularly spaced longitudinally extending guide portions thereupon and is mounted so as to be revoluble about a horizontal axis, an arm member secured to said shaft, and releasable means adapted at one time to engage one of said longitudinally extending guide portions of said shaft so as to prevent rotation of said arm member and at the same time permit an endwise or longitudinal movement thereof and adapted at another time to engage the other of said longitudinally extending guide portions of said shaft in a manner to prevent rotation of said arm member and at the same time permit an endwise or longitudinal movement thereof.

6. An apparatus for testing automobile wheels comprising a standard arranged vertically, a horizontal shaft journalled in the standard for rotatable and reciprocable movement with respect thereto, means for maintaining the shaft stationary relative to the standard, and an arm carried at one end of said shaft and arranged at right angles to the axis thereof for engagement with an automobile wheel at diametrically opposed points thereon.

7. An apparatus for testing automobile wheels comprising a base, a standard arranged vertically and mounted on the base for turning movement about the vertical axis of the standard, a horizontal shaft journalled in the standard for rotatable and reciprocable movement with respect thereto, means for maintaining the shaft stationary relative to the standard, an arm carried at one end of said shaft and arranged at right angles to the axis thereof for engagement with an automobile wheel at diametrically opposed points thereon, the central portion of said arm being offset to accommodate the hub cap structure of a wheel.

JOHN C. CREAGMILE.